United States Patent
Nolan et al.

(10) Patent No.: US 7,359,904 B2
(45) Date of Patent: Apr. 15, 2008

(54) METHOD TO EFFICIENTLY PROCESS AND PRESENT POSSIBLE ARRANGEMENTS OF A SET OF CONTIGUOUS PEER-TO-PEER LINKS

(75) Inventors: Brendan V. Nolan, Ottawa (CA); Guy M. B. Verret, Ottawa (CA)

(73) Assignee: Integrated Knowledge Solutions, Inc., Ottawa (CA)

( * ) Notice: Subject to any disclaimer, the term of this patent is extended or adjusted under 35 U.S.C. 154(b) by 446 days.

(21) Appl. No.: 10/171,722

(22) Filed: Jun. 14, 2002

(65) Prior Publication Data

US 2003/0233362 A1    Dec. 18, 2003

(51) Int. Cl.
G06F 7/00   (2006.01)
G06F 17/00   (2006.01)
G06F 17/30   (2006.01)

(52) U.S. Cl. .......................... 707/100; 707/5; 707/101; 707/102; 707/103 R; 707/104.1

(58) Field of Classification Search ................ 707/102, 707/5, 100, 101, 103 R, 104.1; 717/144
See application file for complete search history.

(56) References Cited

U.S. PATENT DOCUMENTS

| | | | |
|---|---|---|---|
| 5,606,669 A * | 2/1997 | Bertin et al. ................ 709/223 |
| 5,673,369 A * | 9/1997 | Kim .............................. 706/59 |
| 5,953,718 A * | 9/1999 | Wical .............................. 707/5 |
| 5,999,926 A | 12/1999 | Suciu |
| 6,031,993 A * | 2/2000 | Andrews et al. ............ 717/143 |
| 6,112,201 A | 8/2000 | Wical |
| 6,314,424 B1 * | 11/2001 | Kaczmarski et al. .......... 707/10 |
| 6,336,112 B2 * | 1/2002 | Chakrabarti et al. ........... 707/5 |
| 6,711,585 B1 * | 3/2004 | Copperman et al. ..... 707/104.1 |

* cited by examiner

*Primary Examiner*—Wilson Lee
*Assistant Examiner*—Cheryl M Shechtman
(74) *Attorney, Agent, or Firm*—Greer, Burns & Crain, Ltd.

(57) ABSTRACT

A method for displaying knowledge nodes within a set of knowledge nodes, stored as a set of contiguous peer-to-peer relationships, including: choosing interactively any knowledge node within the set as a root, and dynamically creating a tree from the root by selecting a contiguous relationship, from the set, between a first and a second knowledge node in which the first knowledge node is a node at a tip of the tree, checking to see whether the second knowledge node is a real or virtual leaf, adding the second knowledge node to the tip creating a new branch and defining another tip, deducing that the new branch is fully developed and excluding the second knowledge node from being considered as a first knowledge node in reiteration if the second knowledge node is a real or virtual leaf, and reiterating until each peer-to-peer relationship in the set is selected.

2 Claims, 9 Drawing Sheets

METHOD TO EFFICIENTLY PROCESS AND PRESENT POSSIBLE ARRANGEMENTS OF A SET OF CONTIGUOUS PEER-TO-PEER LINKS

FIELD OF THE INVENTION

The present invention relates to a method for storing and presenting knowledge elements, and more particularly to storing and presenting knowledge elements in which relationships to other knowledge elements are known.

BACKGROUND TO THE INVENTION

Information is stored and presented in many ways. In some instances it is stored simply as a mass of individual items within a collection. In this case, finding Information involves searching, generally through the use of keywords or phrases.

The problem with this type of searching is that it can produce unmanageable numbers of hits, most of which are irrelevant or outdated, thus inundating the user. Additionally, information sources that do not contain the keywords but which are nonetheless relevant are missed through this type of information gathering.

In order to overcome the above difficulties, various attempts to organize knowledge have been attempted. A common method of organizing information is through the use of a hierarchical category system. In this type of system a category is created, and various subcategories fall within the category. Each of these subcategories may further have subcategories under it, and so forth, creating a tree like structure.

This hierarchical structure can for example be seen in U.S. Pat. No. 6,112,201 to Wicul. Wicul teaches a structure in which documents are stored in a hierarchical structure and information is classified based on a number of predefined categories. In categorical groupings, information can be placed within a predefined tree of categories in such a way that a user looking for specific information may navigate starting at the root and moving through the leaves of the tree. For example, in a broad database of information, if a user is looking for information about Formula 1 racing in an information database, the user starts at the root. The user may be presented with various categories, such as Arts, Business, Computers, Games, or Sports The most relevant category in this case is Sports, which when selected may lead the user to a list of various sports, the most relevant being Motorsports. When selected, this category may further lead to a number of subcategories about motor sports. The user would thus proceed until the desired subcategory is found.

The problem with a hierarchical arrangement of knowledge elements is that related subjects will often not be present Within the same hierarchical category, or even the same branch of a tree. In the above example, a user may find a Formula 1 race that she is interested in, and then want more information about the venue city, such as places to stay or eat. This information does not however fall within the category of SPORTS>MOTORSPORTS>AUTO RACING>FORMULA 1. While this information is related, it would not be proper to create a subcategory for the venue city here, and the user will thus have to commence a new search.

Another problem with storing knowledge elements in a hierarchical structure is that a knowledge element may properly fit at various points within the tree. This knowledge element is thus placed in these various locations, and as long as it does not change there is no problem. However, if the knowledge element is modified or removed, the tree will have to be modified at every instance of the knowledge node, which can be an onerous task. Also, with this type of structure stale nodes will often be missed, leaving outdated information within the tree.

A further problem with this hierarchical structure is that the root is preset. In an ideal search environment, the root would be the knowledge element the user is interested in, thus allowing the user to navigate through related knowledge elements without having to perform a new search. However, the hierarchical structure presents a rigid arrangement for knowledge elements which limits information gathering by the user.

SUMMARY OF THE INVENTION

The present invention seeks to provide a better method of storing and presenting knowledge elements and to overcome the above limitations In the prior art. Specifically, the present invention provides a method of storing and presenting knowledge which includes a number of knowledge elements with contiguous links between these elements. This structure has the form of a multi-dimensional knowledge map. The information can further be presented as a tree that is arranged based on the selection of any knowledge element as the root.

In the present invention, knowledge elements are stored with relationships to other knowledge elements. These relationships may be unidirectional or directionless, One aspect of the present invention allows a user to define knowledge elements and to establish relationships between the elements. In this way, a view of all of the knowledge elements and their relations to each other provides an overview of what is known about the subject with immediate links to the depth of information available. Knowledge elements can be arranged to provide a particular perspective on a subject—a shape or direction.

Another aspect of the present invention is the ability to present the user with the knowledge elements in a useful manner. Specifically, various users will have different requirements for information that is stored in the collection of linked knowledge elements. In order to allow intelligent access to these knowledge elements, the information may be presented as a tree, wherein the most appropriate element is selected as the root node of a tree, and the remainder of the tree is built based on this root node. This building of the tree involves ensuring that all appropriate elements are built into the tree, but that redundant elements are excluded.

The present invention therefore provides, in a set of knowledge nodes with contiguous peer-to-peer relationships, a method of displaying the knowledge nodes including the steps of: choosing interactively any knowledge node within the set of knowledge nodes as a root node dynamically creating a tree from the root node, the tree including a plurality of branches and being created by: selecting a contiguous relationship, from the set of contiguous peer-to-peer relationships, between a first knowledge node and a second knowledge node in which the first knowledge node is a node at a tip of the tree; checking to see whether the second knowledge node is a real or virtual leaf; adding the second knowledge node to the tip creating a new branch and defining one more tip; deducing that the new branch is fully developed and excluding the second knowledge node from being considered as a first knowledge node in reiteration steps if the second knowledge node is a real or virtual leaf;

and reiterating the selecting, checking, adding and deducing steps until each peer-to-peer relationship in the set of contiguous peer-to-peer relationships is selected.

BRIEF DESCRIPTION OF THE DRAWINGS

The above and further objects, features, and advantages of the invention will become apparent from the following more detailed description when read with reference to the following drawings in which.

DETAILED DESCRIPTION OF THE DRAWINGS

The present invention provides a method 2 for storing and presenting information in a way which overcomes the difficulties of the prior art. The present invention is particularly useful for large repositories of data, including but not limited to the Internet.

Knowledge nodes are stored as a set of contiguous peer to peer relationships in the present invention. In this way, any node may be related to another node, and the relationships are defined at the time of creation.

Figure 1:
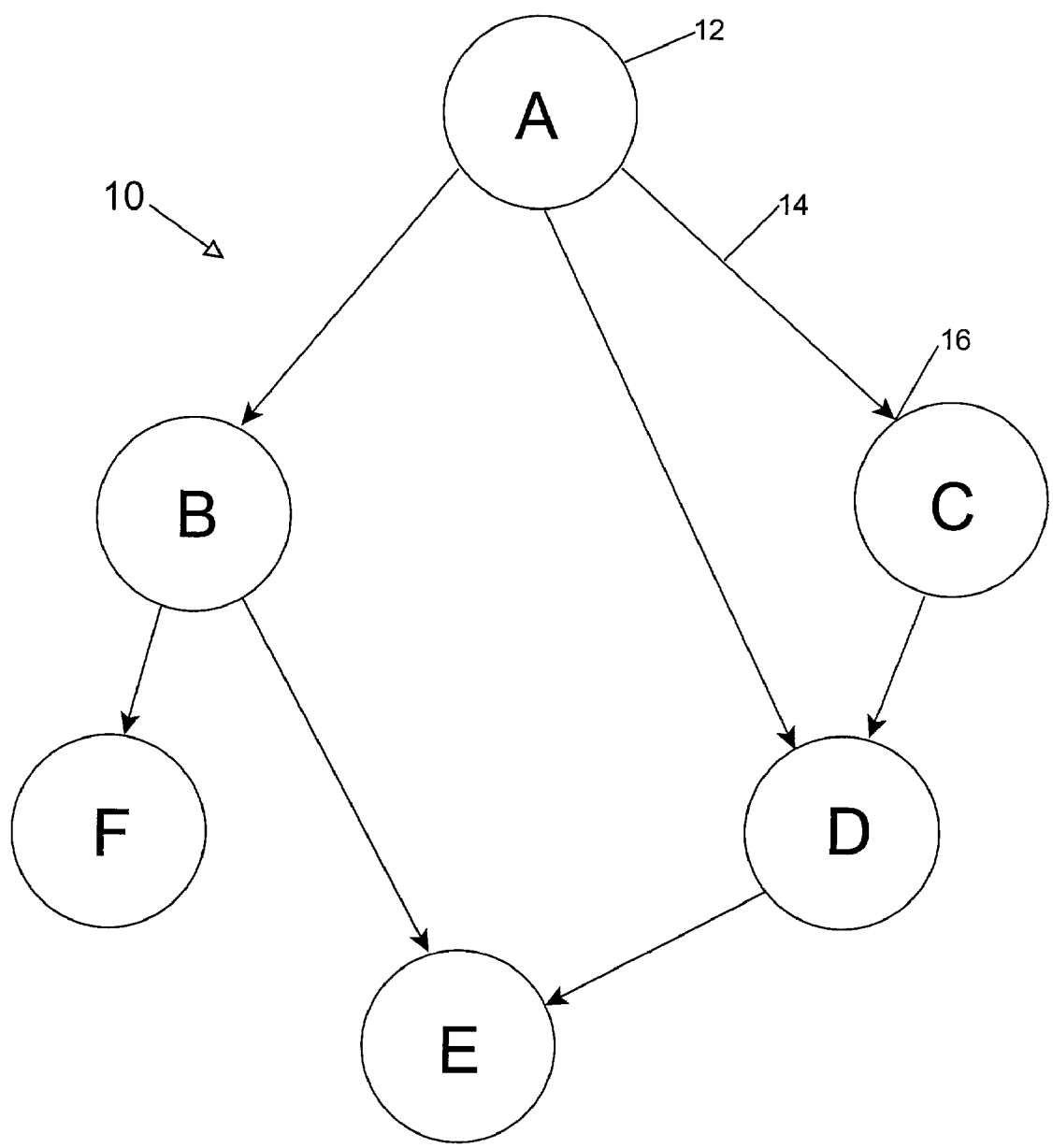
FIG. 1 is a diagram illustrating an example knowledge map created in accordance with the method of the present invention.

Reference is now made to the drawings. FIG. 1 represents an example knowledge map 10 consisting of a number of knowledge nodes 12, along with links 14 which identify relationships between elements. Knowledge map 10 is a representation of the contiguous relationships of the knowledge nodes 12. The knowledge node 12 may cover any size of subject area that a creator wishes to define.

In FIG. 1, links 14 are shown with a direction arrow 16. In one embodiment of the present invention the relationships between objects may be directional. Conversely, it is contemplated that the links may also be bi-directional (i.e. directionless).

A creator of a knowledge map 10 first defines the scope of a knowledge node 12 and then determines relationships to create links 14. For example, in FIG. 1 a user may define a knowledge node 12 represented as "C". The user then determines that this knowledge node has an antecedent relationship from knowledge node "A" and has a descendant relationship to the knowledge node "D". The user thus defines these relationships.

As will be appreciated by one skilled in the art, the relationships in large knowledge maps can be complex and multi-dimensional.

In order to display information that is created in this type of knowledge map 10, a user needs to be presented with a manageable way of navigating between the knowledge nodes 12. This is accomplished by dynamically creating a tree structure using the knowledge node 12 that is dynamically selected to be the root.

Figure 2:
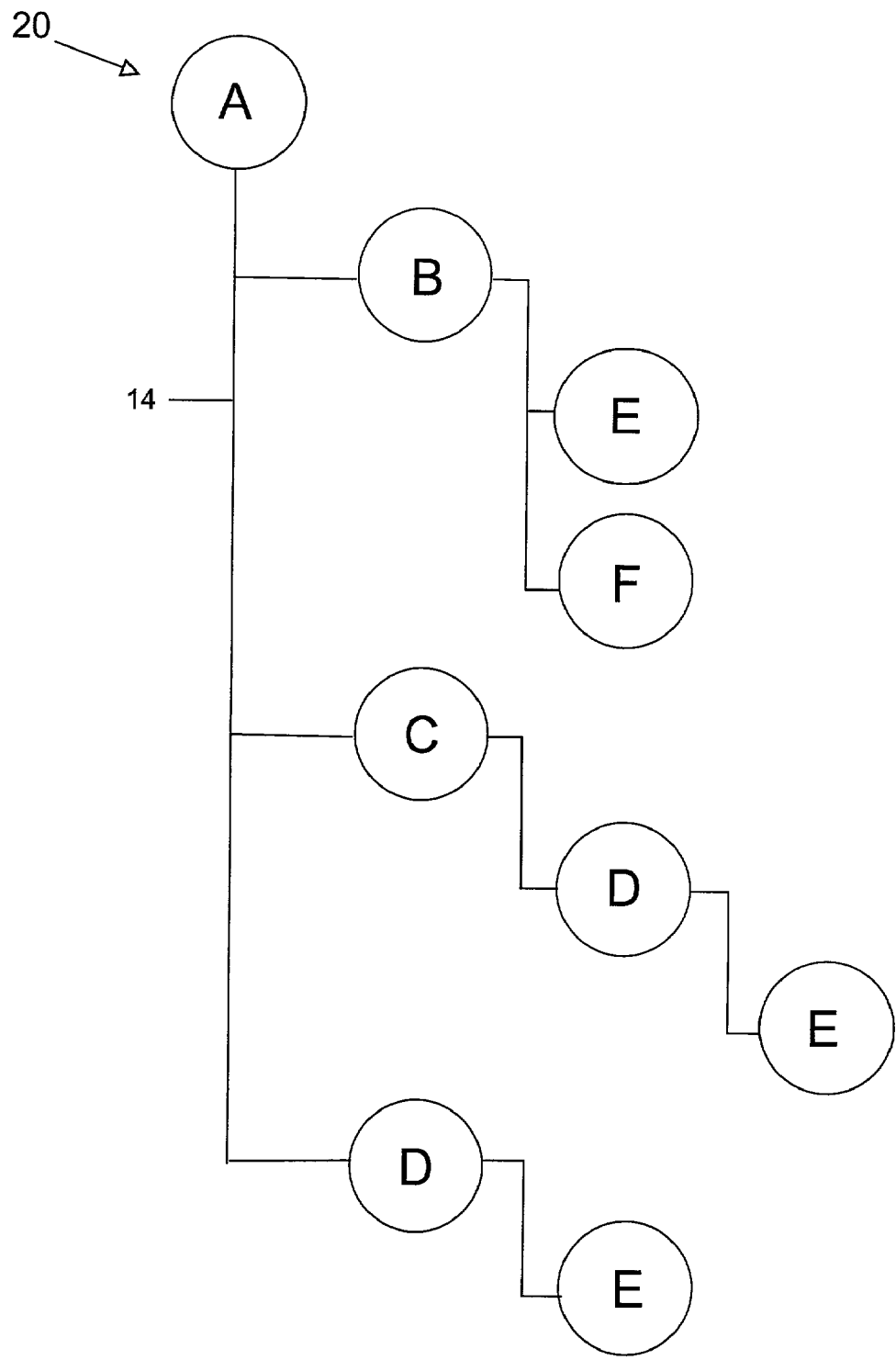
FIG. 2 is a diagram illustrating a dynamic tree created from the knowledge map of FIG. 1.

FIG. 2 shows a tree 20 which is created from the knowledge map of FIG. 1 when knowledge node "A" is selected as the root. Knowledge node "A" has a relationship to nodes "B", "C", and "D", which are represented as children of element "A". Element "B" further has a relationship with nodes "E" and "F", which are thus children of node "B". Further node "D" has a relationship with node "E" and node "C" has a relationship with node "D". By using these relationships, which are represented by links 14 in FIG. 2, a tree can be generated from the knowledge map.

When the user wishes to change the focus of the search, or when the system needs to be configured to meet the needs of a different user, a new root may be selected and the tree dynamically created.

In one embodiment of the present invention links 14 will include direction information to indicate whether the relationship of one node to another is antecedent or descendent. A user will preferably have the ability to choose whether to create a tree with the direction tracking enabled or disabled.

Figure 3:
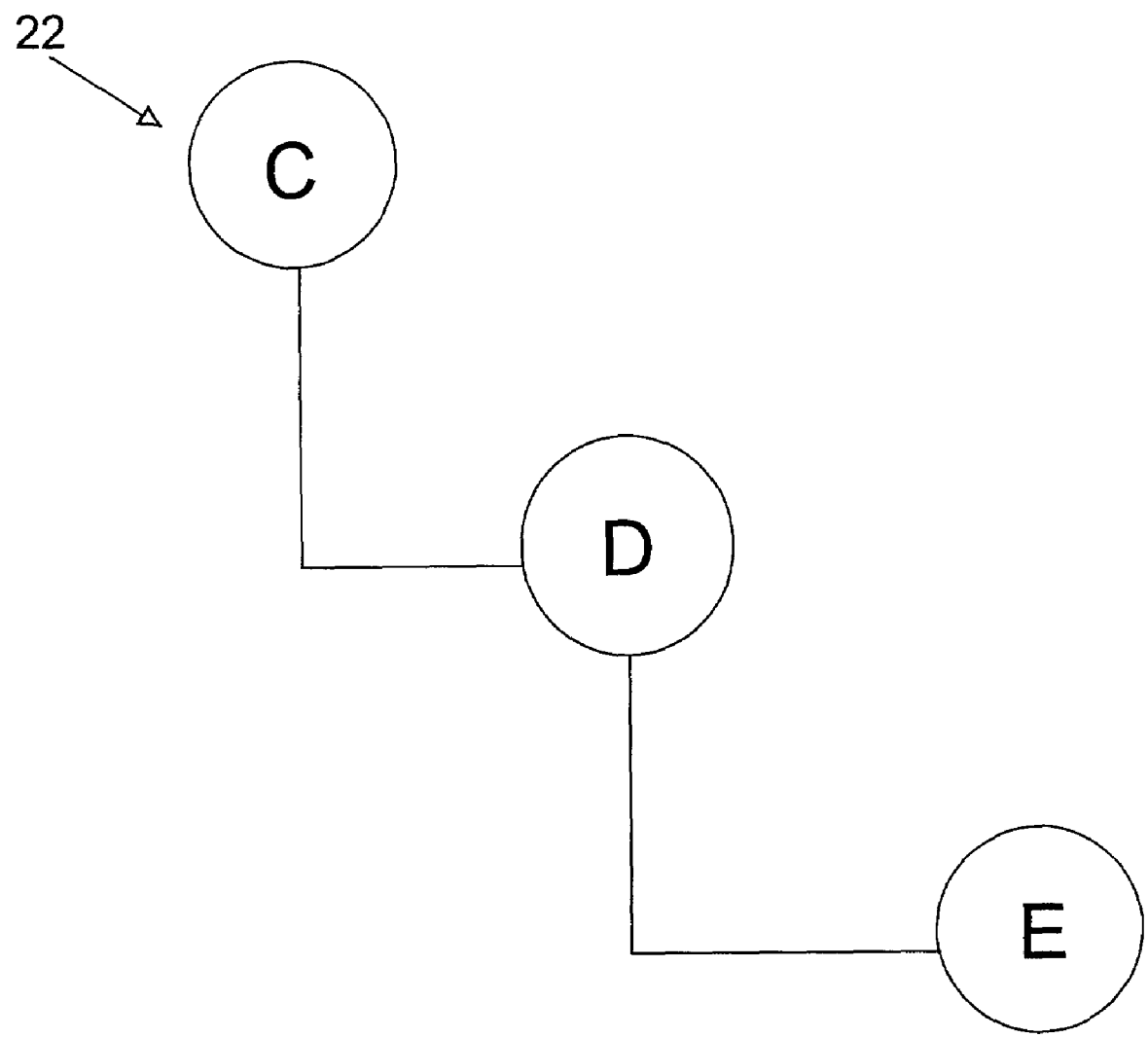
FIG. 3 is a diagram illustrating a dynamic tree created in accordance with the method of the present invention using direction selection and a different root node than in FIG. 2.

FIG. 3 shows a tree 22 that is created when direction selection is on using the knowledge map of FIG. 1. This tree shows that the root node "C" is related to node "D" which is related to element "E" in that hierarchy.

Figure 4A:
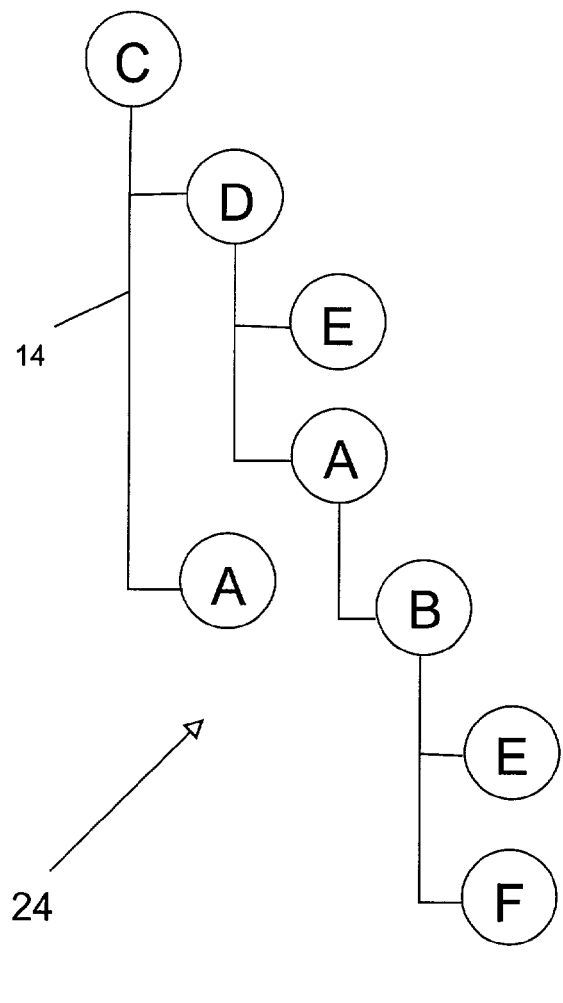
FIG. 4a is a diagram illustrating a dynamic tree created in accordance with the method of the present invention using the same root as in FIG. 3, but with no direction.

FIG. 4a illustrates a tree 24 that is created when the same node "C" is selected as the root, but when direction selection is off. In this case the relationships represented by links 14 are bidirectional, and tree 24 shows that a user can navigate through the relationships linking nodes to node "C" as well as the relationships from nodes "C" to other elements.

In order to create tree 24, care must be taken to ensure that redundant nodes are not added to the tree, but that all nodes that are required to be present exist within the tree. If this was not done, then problems such as infinite trees could exist due to the addition of elements that exist in a loop. For example, element "C" has a relationship to element "D" which has a relationship to element "A", which has a relationship to element "C". If the tree 24 was built without regard to which nodes already exist in the tree, the tree would expand infinitely.

Figure 4B:
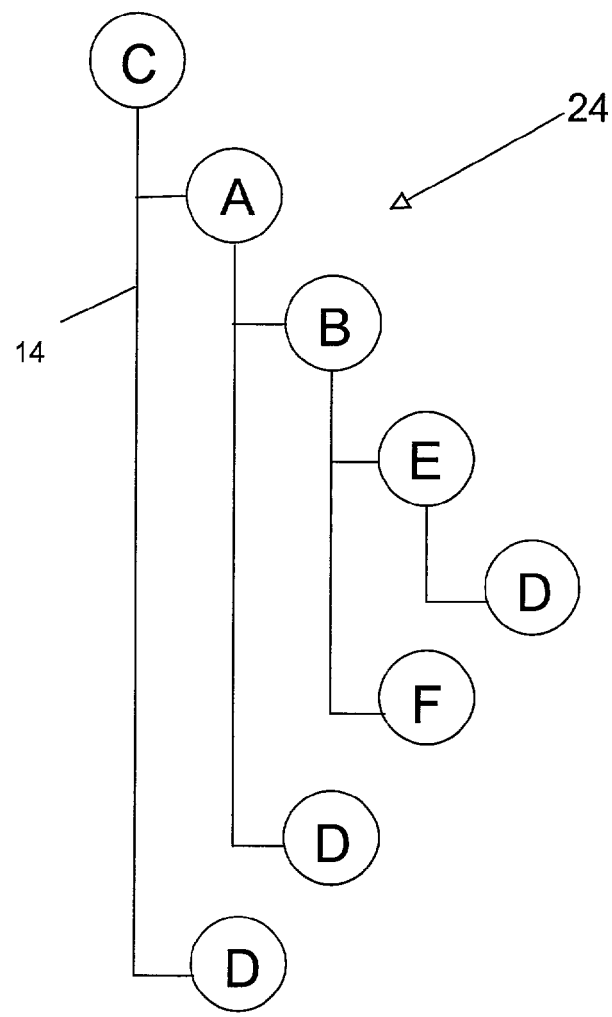
FIG. 4b is an alternative representation to the dynamic tree of FIG. 4a created in accordance with the method of the present invention.

FIG. 4b is an alternative representation to the dynamic tree of FIG. 4a created in accordance with the method of the present invention. The difference between the trees of FIG. 4a and FIG. 4b is due to the order of records in the Table of Knowledge Node Relationships 38 and is repeatable for that order and each tree is navigable through the entire set of valid relationships.

Figure 5:
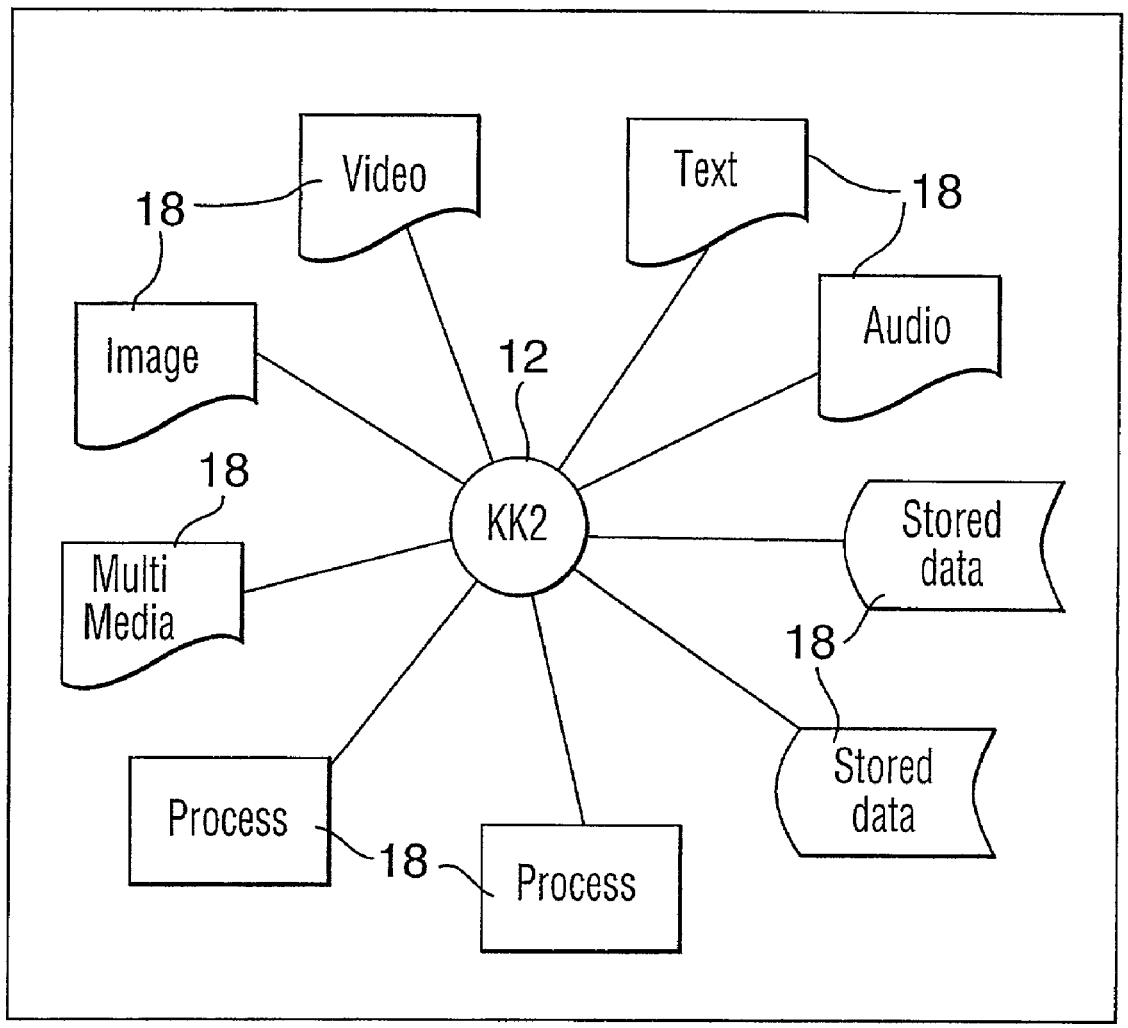
FIG. 5 is a diagram of one embodiment of a knowledge node in which the knowledge node includes information elements.

Reference is now made to FIG. 5. In one embodiment, the present method is implemented in the following way. Knowledge nodes 12 are created which can cover a subject area. Each knowledge node 12 can have a number of information elements 18 that relate to the node. These information elements 18 can be in any form, including but not limited to text, audio, video or data. It will be understood by one skilled in the art that the knowledge node 12 can, however, exist without information elements 18.

Figure 6:
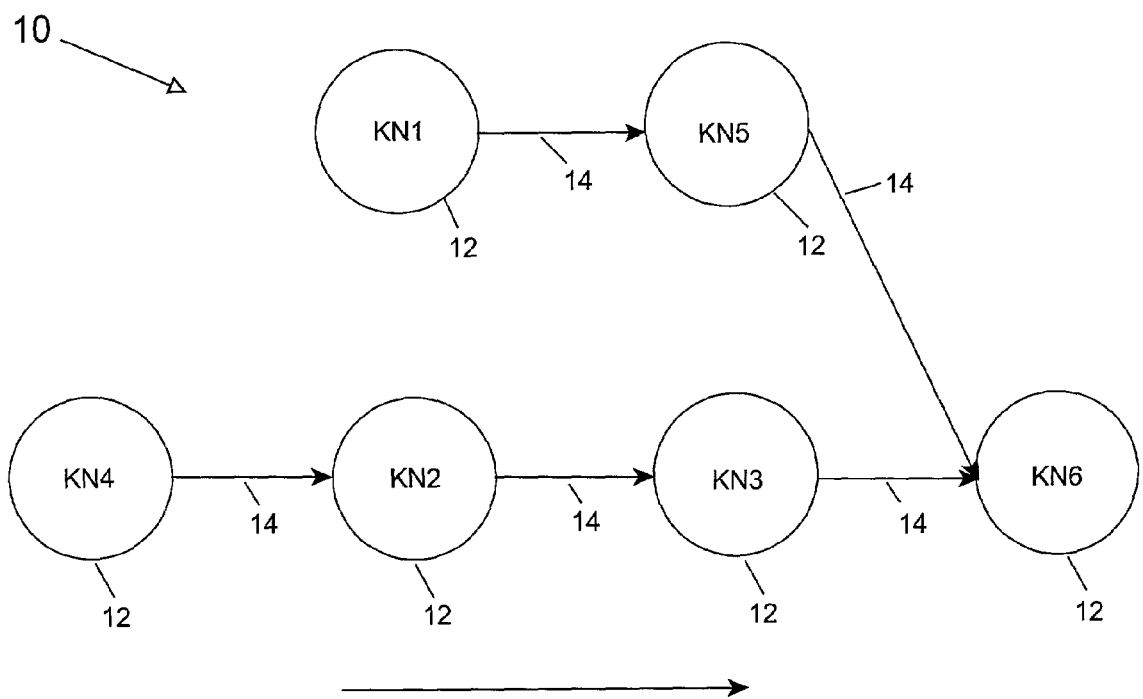
FIG. 6 is a diagram of a knowledge map created in accordance with the method of the present invention.

Each knowledge node 12 can exist as an entity by itself. However, the usefulness of the knowledge node 12 is increased when the knowledge node is linked to one or more different knowledge nodes, as illustrated in FIG. 6. A view of the knowledge nodes 12 and their relations, to each other provides an overview of what is known about the subject with immediate links to the depth of information available. Further, the knowledge nodes 12 can be arranged to provide a particular perspective on a subject.

Figure 7:
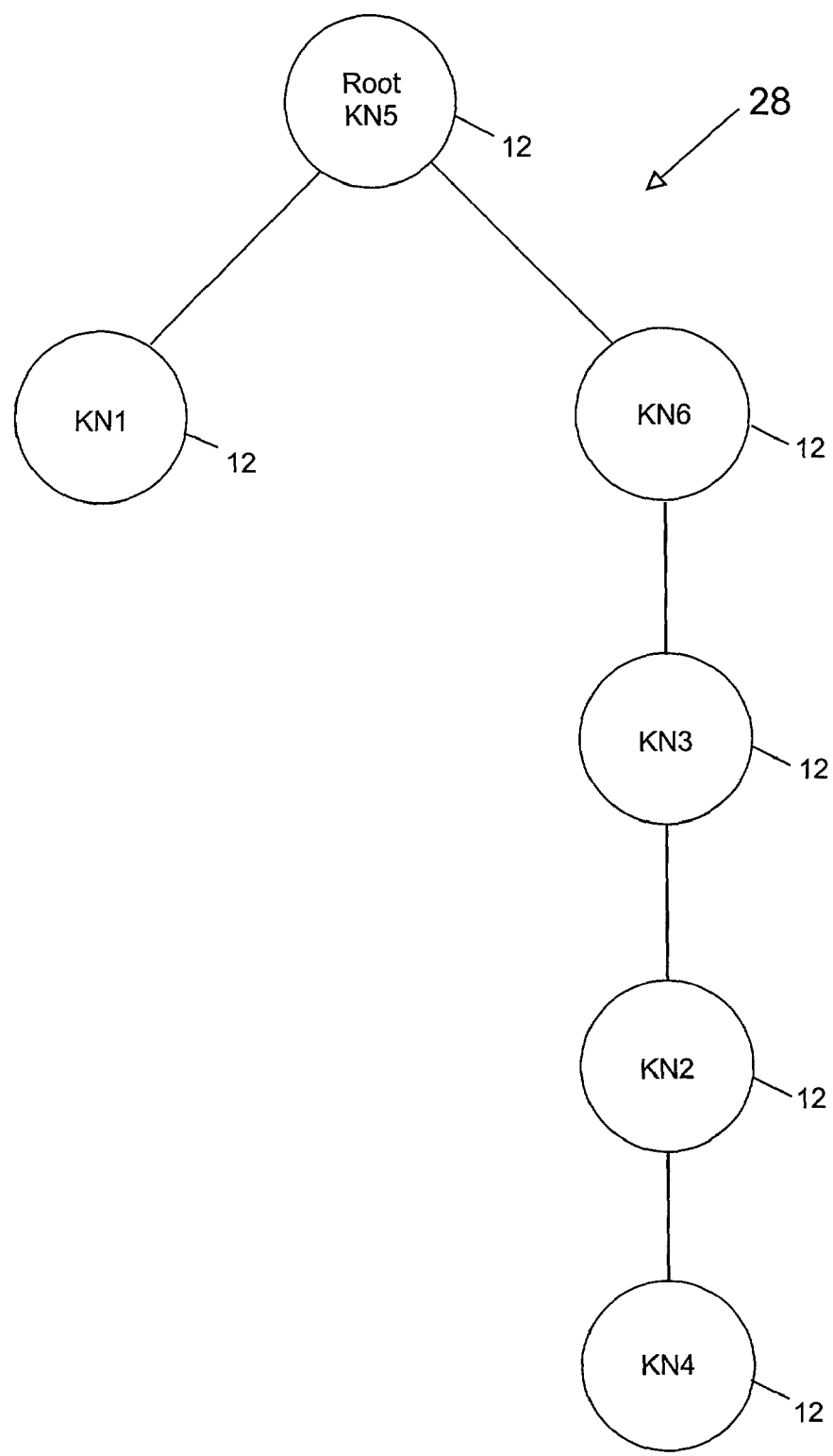
FIG. 7 is a diagram of a dynamic tree created in accordance with the method of the present invention from the knowledge map in FIG. 6.

Once a knowledge map 10 exists, the knowledge nodes 12 can be arranged in a tree format through the selection of a root. FIG. 7 Illustrates the knowledge map 10 of FIG. 6 rearranged into a tree 28.

Figure 8:
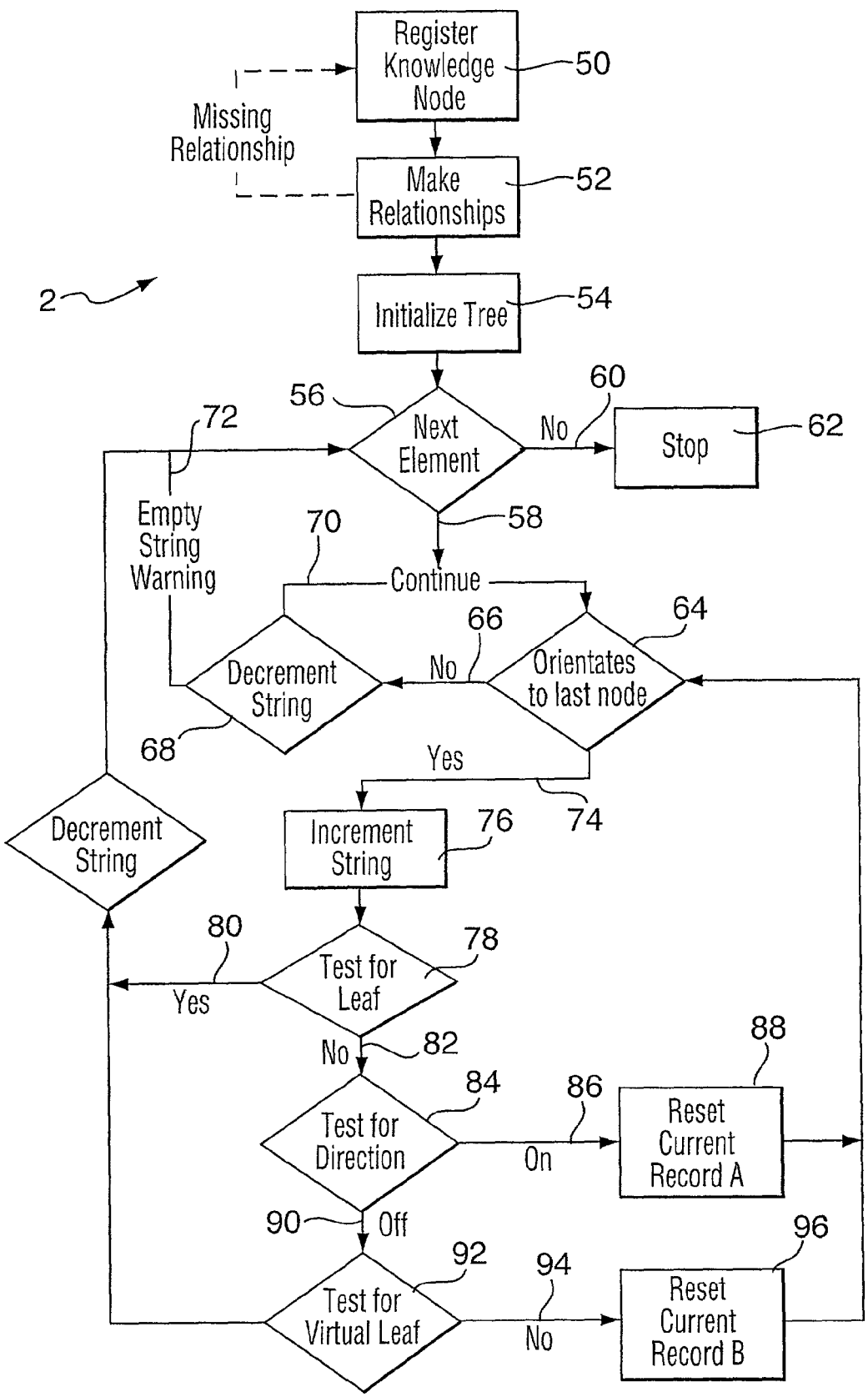
FIG. 8 is a flow diagram illustrating the general steps of the method in accordance with the present invention.
Figure 9:
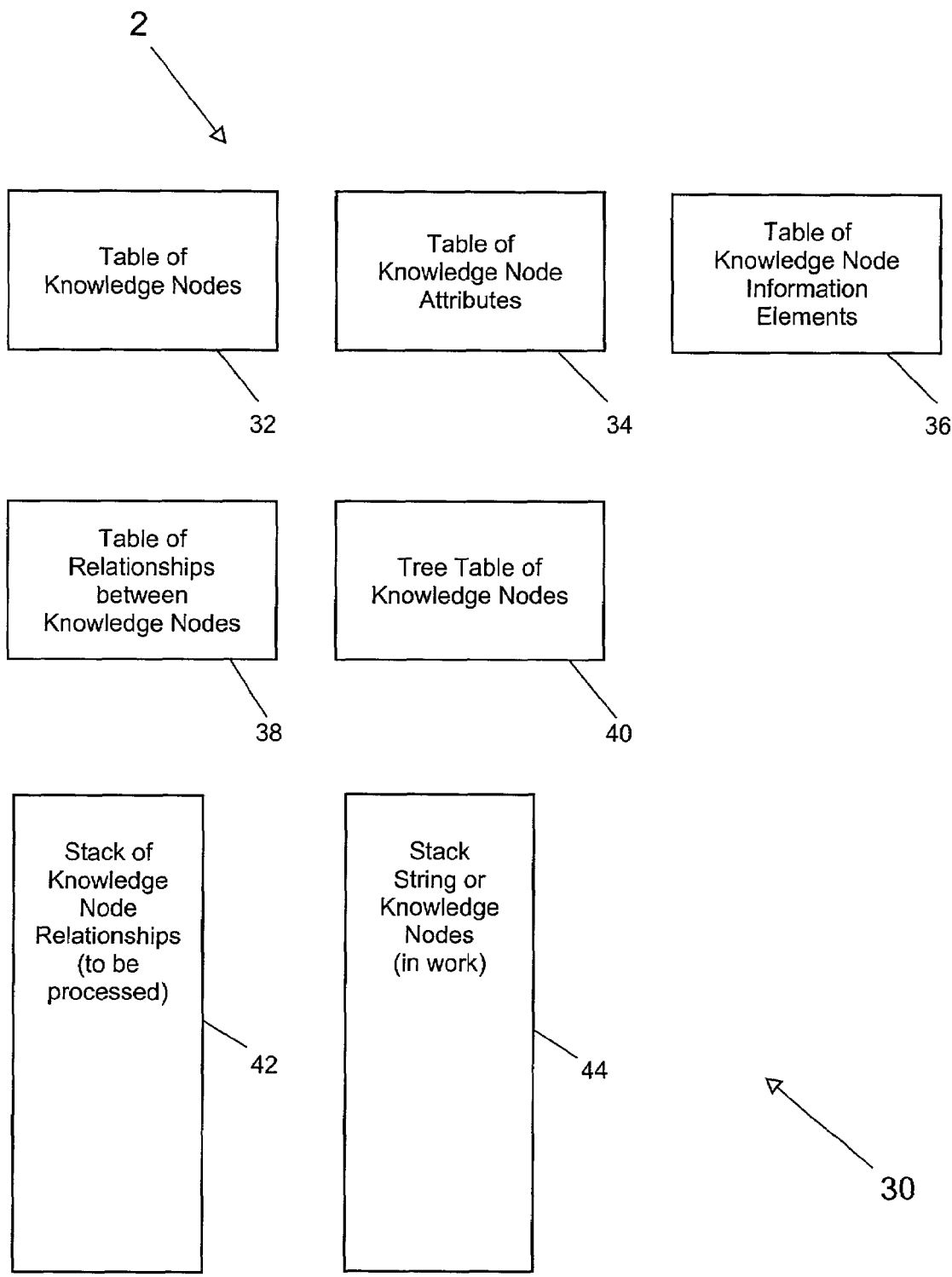
FIG. 9 is a diagram illustrating a preferred information storage arrangement for the present invention.

A preferred method for doing this is illustrated in FIG. 8 and by the Pseudo Code below. FIG. 9 shows a storage arrangement 30 for storing various data. These include knowledge node table 32, knowledge node attribute table 34, knowledge node Information element table 36, knowledge node relationship table 38, knowledge node tree table 40, knowledge node relationship stack 42 and knowledge node string stack 44. Each of these elements are described in more detail below with respect to method 2.

FIG. 8 shows method 2 which includes steps 50 and 52 for creating a knowledge map 10. Step 50 involves the registration of a knowledge node. At this step, method 2 determines whether the knowledge node 12 trying to be registered exists In knowledge node table 32 (FIG. 9). Knowledge node table 32 stores all of the knowledge nodes currently in knowledge map 10.

If the knowledge node 12 exists in table 32 then method 2 skips to step 52. Otherwise step 50 registers knowledge node 12 in knowledge node table 32, prompts the user for information elements, and relates information elements to the knowledge node in the knowledge node information element table 36. Step 50 may also prompt a user to place attributes in the knowledge node attribute table 34. The attributes stored in table 34 are data values that can be used to profile a knowledge node 12 by, for example but not limited to, subject, group, profession, rank. It is envisioned that in some embodiments, many tables may represent the attributes table.

An example of the various types of the information elements 18 is seen in FIG. 5, and table 36 stores a list of the information elements for each knowledge node 12 or link 14.

In one embodiment, it is foreseen that step 50 further creates an instance of the knowledge node in Standard Generalized Markup Language (SGML) or other similar format.

In step 52, method 2 makes relationships between knowledge nodes 12. The knowledge nodes 12 are contained within the knowledge node table 32, and if step 52 somehow finds that this is not the case it will return method 2 to step 50. Otherwise step 52 checks to see whether a relationship for the nodes 12 exists within the knowledge node relationship table 38.

If a relationship exists, then it is modified according to the new information provided. This includes prompting for amendments to information elements In the knowledge node information elements table 36 as required, allowing a user to amend the attributes in the knowledge node attribute table 34 as required, amending the instance of the antecedent node and amending the instance of the descendent node.

In one embodiment of the present invention the relationships can also have amplifying factors. These factors allow certain knowledge nodes to be selected over others in specific instances. For example, if a creator of a knowledge node 12 is within one demographic, amplifying factors may be added to give precedence to the selection of a-that knowledge node for a user in the same demographic. In one example, a forty year old man and a fourteen year old girl may be pointed to different knowledge nodes when searching for music based on these amplifying factors.

In step 52, if a relationship does not exist then the relationship is registered in the knowledge node relationship table 38. Attributes are added to the knowledge node attribute table 34 as required, and information elements are added to the knowledge node information table 36 as required. Further the instance of the antecedent node and the instance of the descendent node are amended.

At this point it should be possible to view an instance of a knowledge node 12 and to view its antecedents, descendents, the information elements assigned to it, the attributes assigned to each link and the information elements assigned to each link.

Method 2 can next move to step 54. In step 54 a tree is initialized. This Is done to create a tree like the ones illustrated in FIGS. 2, 3, 4 and 7. Step 54 involves determining whether the direction selection is set on or off. It further involves the selection of a root knowledge node 12.

Once the root is selected, step 54 creates a knowledge node relationship stack 42 which uses the information from the knowledge node relationship table 38. This creation of stack 42 ensures that the root knowledge node is within the knowledge node relationship table 38.

Step 54 also creates a string of knowledge nodes stack 44 and inserts the root knowledge node as the first element in the stack.

Step 54 further adds the root knowledge node to knowledge node tree table 40 and assigns this knowledge node as the root. Method 2 next moves to step 56.

Step 56 analyses whether there are further relationships to be processed. It pops an element from stack 42 if one exists. If the element exists, method 2 marks the element as the current relationship record (CRR) and moves along branch 58 to step 64. Otherwise method 2 moves along branch 60 to step 62.

Step 62 ends the tree building. At this point the string of knowledge nodes stack 44 should equal the last complete string.

Step 64 orients to the last node. If the direction selection is off, the CRR is checked with the top of stack 44. If either of the nodes in the relationship of the CRR match the top of stack 44, then the node matching the top of stack 44 in the CRR is marked as the antecedent and the other node in the relationship is marked as a descendent and method 2 them moves along branch 74 to step 76.

If the direction selection is on, step 64 checks whether the antecedent in the CRR is the same as the top element of stack 44. If it is, method 2 moves along branch 74 to step 76.

If the direction is off and neither node associated with the CRR is on top of stack 44, or if the direction is on and the antecedent node is not on the top of stack 44, then method 2 moves along branch 66 to step 68.

At step 68, method 2 decrements the string. This step checks to see whether stack 44 is empty. If it is, method 2 moves along branch 72 back to step 56, while giving an empty string warning. If the stack 44 contains elements, then the top of the stack is discarded and method 2 moves along branch 70 back to step 64.

At step 76 a new tree record is created in tree table of knowledge nodes 40, and stack 44 is updated with the new information from the tree table of knowledge nodes 40. Method 2 next moves to step 78.

In step 78, method 2 checks whether only one instance of the descendent node of the CRR exists in the knowledge node relationship table 38. This only occurs when the descendent node is a real leaf, and thus if the test finds that there is only one instance, method 2 moves along branch 80 back to step 56.

If step 78 finds more than one instance of a descendent node, method 2 moves along branch 82 to step 84. Step 84 checks to see whether direction is on to determine if it is necessary to check for a virtual leaf. If it is, then method 2 moves along branch 86 to step 88. Otherwise, method 2 moves along branch 90 to step 92.

In step 88 the CRR is updated with the first occurrence of a relationship record from the knowledge node relationship table 38 where the antecedent knowledge node 12 equals the top of stack 44 as long as the descendent knowledge node 12 does not appear elsewhere in stack 44. Step 88 then adds all of the other records that meet this criteria to stack 42.

If step 84 determines that the direction is off, method 2 moves to step 92. In step 92, the descendent node of the CRR is tested to see whether it already exists in the stack 44. If it does, then the knowledge node is a virtual leaf and is marked as an "End of String" in the tree table of knowledge nodes 40 and method 2 moves to step 56.

If not, step 92 then tests to see whether the descendent node of the CRR has been included in another developed branch of the tree by verifying it has been marked as previously selected in table 32. If it is marked this way then the descendent node is marked as a virtual leaf in the tree table of knowledge nodes 40 and method 2 moves to step 56.

In the present document, a real leaf is defined as a node that participates in only one relationship in the set of relationships under consideration, and a virtual leaf is defined as a node that has already been placed in the developed structure once in the current compilation.

If neither of the tests for a virtual leaf in step 92 is met, method 2 moves along branch 94 to step 96. In step 96 the CRR is updated with the first occurrence of a relationship record from the knowledge node relationship table 38 that has one knowledge node that equals the top of stack 44 and the other knowledge node does not appear anywhere else in stack 44. Step 96 then adds the remaining records that meet this criteria to stack 42. Method 2 then moves to step 64.

The above thus creates a tree from the knowledge nodes 12 in which the root is determined at an initialization stage, and which ensures that the tree does not contain redundant elements.

The above may be more clearly understood from the pseudo code below, which outlines what was indicated above.

---

Pseudo Code for Algorithm "General Solution to Knowledge Structure Management

```
START
Register Knowledge Node
    Does Knowledge Node exist in Table 32?
    IF "No"
        THEN: Register Knowledge Node in Table 32
        Relate Attributes from Table 34 as required
        Relate Information Elements from Table 36 as required
        Generate SGML Instance
Make Relationship(s)
    DO while new relationship exists
        Does related Knowledge Node exist in Table 32
            IF "No"
                THEN: Register Knowledge Node
            Select Antecedent Node
            Select Descendent Node
            Does relationship exist in Table 38
            IF "Yes"
                THEN: Amend Amplifying notes as required
                    Amend Attributes from Table 34 as required
                    Amend Information Elements from Table 36 as required
                    Amend SGML Instance of Antecedent Node
                    Amend SGML Instance of Descendent Node
            ELSE
                    Add amplifying Note if necessary
                    Register record in Table 38
                    Add Attributes from Table 34 as required
                    Add Information Elements from Table 36 as required
                    Amend SGML Instance of Antecedent Node
                    Amend SGML Instance of Descendent Node
    Comment
    At this point it should be possible to view an SGML instance of a Knowledge Node
    and view;
            - The Knowledge Node's Antecedents, and the Descendants
              with note related to each one as written.
            - The Information elements assigned to the Knowledge Node
            - The attributes assigned to each link and their values
            - The Information elements assigned to each link
Initialize Tree
    Set Rules
    Set Direction On/Off
    Select starting Knowledge Node and assign as Root location in Table 40
    Create stack 42 of Knowledge Node Relationships (records) from Table 38
    where starting knowledge node in Table 40 exists in Table 38
```

-continued

| Pseudo Code for Algorithm "General Solution to Knowledge Structure Management" |
| --- |

```
        Create Stack 44 of String of Knowledge Nodes with Root Node as first element
            in stack.
Next Element
        IF Records exist in Stack 42
            THEN: select top record of Stack 42 and assign as Current Relationship
            Record (CRR)
        ELSE
            STOP (Stack 44 should equal the last complete string)
Orientate to Last Node
        IF Direction = "Off" AND either Knowledge Node value in CRR equates to the top
        of stack 44
            THEN: Assign this Knowledge Node as antecedent AND Assign other
                Knowledge Node as descendent.
                Increment String
        IF Direction = "On" AND Antecedent = top of Stack 44
            THEN: Increment String
        Decrement String
Decrement String
        IF Stack 44 is empty
            THEN: Next Element (Execution warning required)
        Discard top record of Stack 44
        Orientate to Last Node
Increment String
        Create new tree record in Table 40
        Update Stack 44 with descendent node of CRR and mark record on table 32
Test for Leaf
        IF Descendent Knowledge Node exists only once in Table 38
            THEN: (It is certainly a leaf) Next Element
Test for Direction
        IF Direction set to "On"
            THEN: Reset Element A
Test for Virtual Leaf
        IF the Descendent Node of the CRR already exists in stack 44
            THEN: Mark Record in Table 40 as "End of String"
                Next Element
        IF "Table 32 Selected" for Descendent Node of the CRR = "True"
            THEN: Mark Record in Table 40 as "A Virtual Leaf"
                Next Element
        Reset Element B
Reset Element A
        Update CRR with first occurrence of relationship record from Table 38
        where Antecedent Knowledge Node equals top of Stack 44 and the other
        Descendent Knowledge Node does not appear elsewhere in Stack 44.
        Add remaining records that meet this criteria to Stack 42.
Reset Element B
        Update CRR with first occurrence of relationship record from Table 38
        where one Knowledge Node equals top of Stack 44 and the other
        Knowledge Node does not appear elsewhere in Stack 44.
        Add remaining records that meet this criteria to Stack 42.
```

The above is preferably implemented using four separate parts. The first is referred to as the "Net-GAINS" program. This is the builder program which can build collections of information or files and specify the linkage between them. In one embodiment, when the above is being used for creating knowledge maps from the Internet, Net-GAINS can be used in conjunction with a web browser, currently Internet Explorer, and allows a user to drag addresses to the program to create knowledge nodes and to specify relationships between them.

Net-GAINS can also be used to combine multiple collections. For example, if in the Internet example two collections were made that had a node in common, Net-Gains could be used to combine the collections. Also, two collections with no nodes in common could be combined by adding a relationship link between a node in each of the collections.

Net-GAINS can also be used to arrange the contents of an interactive electronic technical (IETM) manual. This presents the advantage that an author can create the information object outside of the IETM and then the manual can be constructed from other segments, and the information object can further be reused.

In one envisioned embodiment, Net-Gains will allow a user to tailor collections to meet specific requirements of the user.

In an alternative embodiment, referred to herein as "Net-GAINS Pro", a slightly different capability to add relationships in step 52 is envisioned. Those skilled in the art will appreciate that under certain conditions a nodule will possess more than one natural root A natural root is defined herein as a node where all the relationships in which the node participates are deemed to flow away from the node. In other words, the node is deemed to always be a parent node when direction is enabled.

The idea of multiple roots may be difficult for a novice user. Consequently, in the preferred embodiment, Net-GAINS allows only one natural root. Conversely, Net-GAINS Pro will permit the creation of multiple natural root structures and can be used by more experienced users.

Net-GAINS Pro does not change the building of a structure according to the method of the present invention. Rather, it permits an increased degree of possible complexity for the structures.

The second element is a dynamically linked library, referred to herein as IKS.dll. This library processes the links according to method 2 to develop the arrangement of a set of contiguous peer to peer links. The dll has multiple distinct interfaces, Including Net-GAINS and Free-Gains, which are defined below.

The third element is a storage means. This is a file that stores the links and the information associated with them. It requires the IKS.dll file to function.

The fourth element is an interface known as Free-GAINS. This is a plug-in for a world wide web browser and shows the set of related nodes as a tree. As indicated above, any node can be the root, and the interface allows the user to select whether the direction setting is on or off. This interface displays the file path or the Universal Resource Locator (URL) associated with the node.

Although the present invention has been described in detail with regard to the preferred embodiment thereof, one skilled in the art will easily realize that other versions are possible, and that the invention is only Intended to be limited in scope by the following claims.

The invention claimed is:

1. A computer implemented method for displaying user-selected knowledge nodes within a set of knowledge nodes, stored as a set of linked pairs of nodes, comprising the steps of:

a) providing a set of knowledge nodes each configured for being selectable as at least one of a root node, an antecedent node and a descendent node; and b) choosing interactively any knowledge node within said set of knowledge nodes as a root node;

c) selecting any knowledge node within said set of knowledge nodes as a second of said nodes to form a linked pair of said nodes, wherein said second node is distinct from said root node;

d) determining if a relationship between said root and second nodes is directionless or directional;

e) determining whether said second node is antecedent or descendent of said root node;

f) selecting a third node from any knowledge node within said set of knowledge nodes;

g) determining if a relationship between said third node and either of said root and second nodes is directionless or directional;

h) determining whether said third node is antecedent or descendent of either of said root or said second nodes, said third node forming a separately arranged linked pair with either of said root or said second nodes;

i) repeating steps f-h with additional nodes from said set of knowledge nodes; and j) displaying a knowledge map developed from said separately arranged linked pairs, each of said linked pairs individually sharing a common node.

2. The computer implemented method of claim 1, wherein said relationships between said root node, said second node and subsequently selected nodes are non-hierarchical.

* * * * *